(No Model.)
C. H. FREYER.
OIL PURIFYING APPARATUS.
No. 516,703. Patented Mar. 20, 1894.
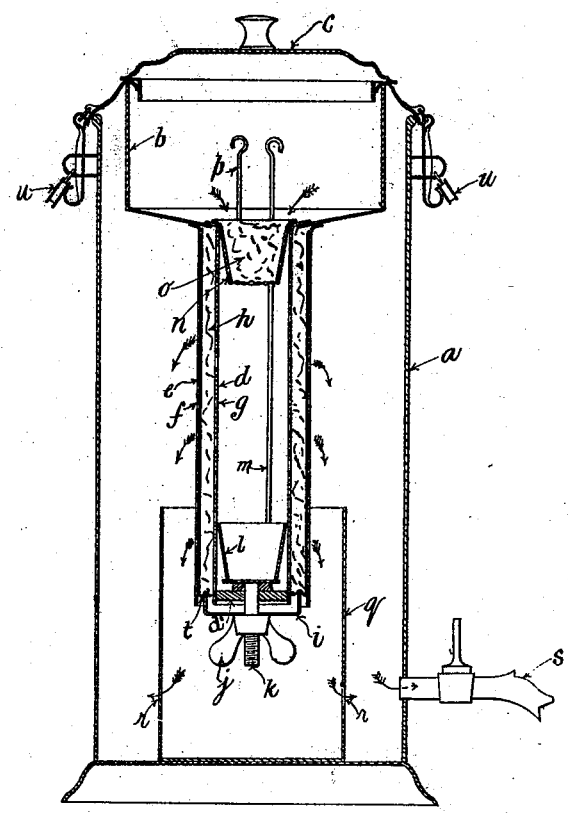
Witnesses
Benjamin Clark.
James Fleming.
Inventor
Charles Herman Freyer
per E. Eaton
His Attorney

UNITED STATES PATENT OFFICE.

CHARLES HERMAN FREYER, OF LONDON, ENGLAND.

OIL-PURIFYING APPARATUS.

SPECIFICATION forming part of Letters Patent No. 516,703, dated March 20, 1894.

Application filed March 27, 1893. Serial No. 467,778. (No model.) Patented in England November 2, 1892, No. 19,745.

*To all whom it may concern:*

Be it known that I, CHARLES HERMAN FREYER, a subject of the Queen of Great Britain, and a resident of London, England, have invented certain new and useful Improvements in Oil-Purifying Apparatus, (for which I have applied for a patent in Great Britain, No. 19,745, dated November 2, 1892,) of which the following is a full, clear, and exact specification.

This invention relates to an improved apparatus for filtering and purifying oil, in which the oil percolates from a reservoir through filtering material and the sediment and water which separate during the process are collected in a receptacle from which they may be discharged.

Referring to the annexed drawing the figure is a sectional side elevation of my improved oil filter.

This filter is particularly useful in purifying oil which has been used for lubricating machinery and afterward collected.

$a$ is an outer casing supporting the receptacle $b$, having a lid $c$. This receptacle communicates with a double walled chamber $d$—$e$, having perforations $f$, and $g$, between the walls of which the filtering material such as cotton wool $h$ is placed.

$i$ is a cap which is secured in position by means of a thumb screw $j$ and screw peg $k$, the peg $k$ being attached to the inner wall $d$ by plate $d'$.

$l$ is a cup attached to the rod $m$ for enabling same to be withdrawn; the cup $l$ being for the purpose of collecting any sediment which may settle from the oil and also any water.

$n$ is a cup filled with filtering material $o$, such as cotton wool and provided with the handle $p$, for removing the same. The bottom of this cup $n$ is perforated.

$q$ is a tank having perforations $r$; this tank $q$ also collects any sediments or water not eliminated by the double walled chamber $d$—$e$.

The filtering material $h$ is surrounded by a layer of filtering paper $t$, the ends of which are turned over and secured by the rim of the cap $i$ against the filtering material $h$.

$u$ are padlocks for retaining the receptacle $b$, and double walled chamber $d$—$e$, to which it is attached in position.

The action is as follows. The oil to be purified is poured into the receptacle $b$; it then percolates through the filtering material $o$ in the cup $n$, then through the filtering material $h$, and into the tank $q$, through the perforations $r$ and finally to the withdrawal cock $s$; the course of the oil being indicated by the arrows. The sediment and water settle to the bottom of the cup $l$ and tank $q$ owing to their greater specific gravity.

With this description of my invention, what I claim, and desire to secure by Letters Patent, is—

In apparatus for filtering and purifying oil, in combination, an outer casing, a receptacle and perforated double walled chamber, provided with filtering material, and supported by said outer casing, a cap, screw peg and thumbscrew for retaining the filtering material in position two cups, provided with handles one cup having filtering material and perforated bottom and placed at the top of double walled chamber, the other at the bottom, a perforated tank, placed underneath said double walled chamber, a cock, fixed in outer casing for withdrawal of oil, hasps and padlocks for retaining receptacle in position, substantially as described.

In testimony that I claim the foregoing I have hereunto set my hand this 21st day of January, 1893.

CHARLES HERMAN FREYER.

Witnesses:
 JAMES FLEMING,
 S. CRANSON.